Jan. 13, 1948.   C. R. LEMONIER ET AL   2,434,464
CARGO AIRPLANE
Filed June 18, 1943   3 Sheets-Sheet 1
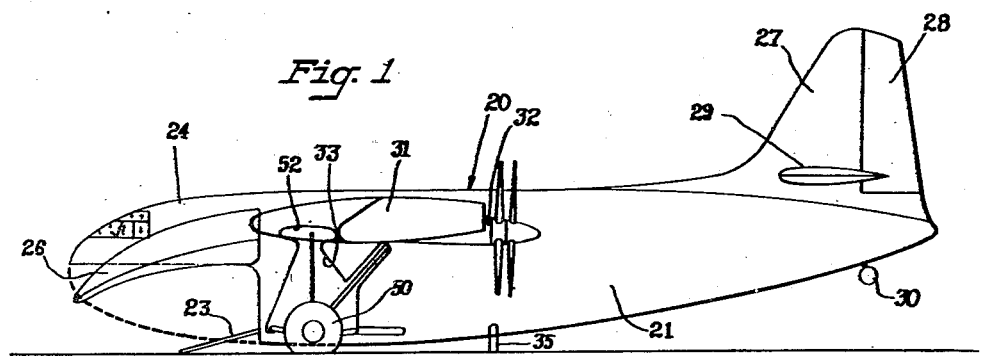
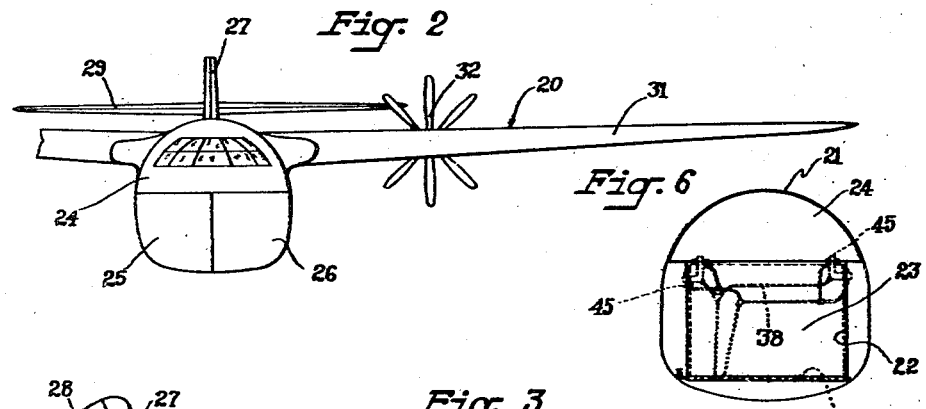
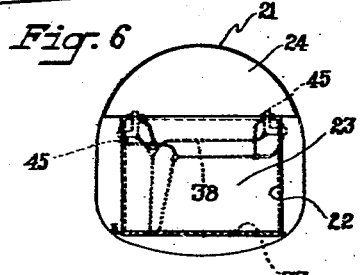
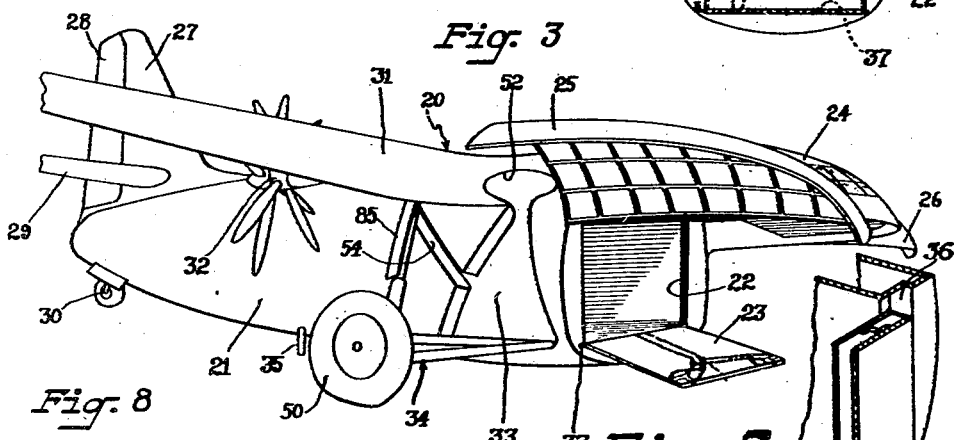
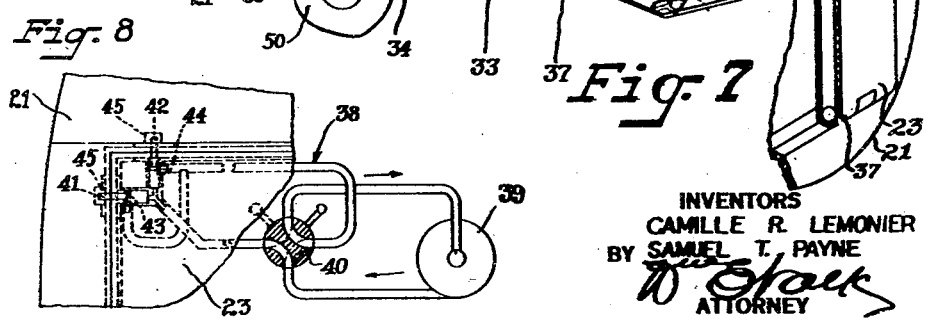
INVENTORS
CAMILLE R. LEMONIER
BY SAMUEL T. PAYNE
ATTORNEY

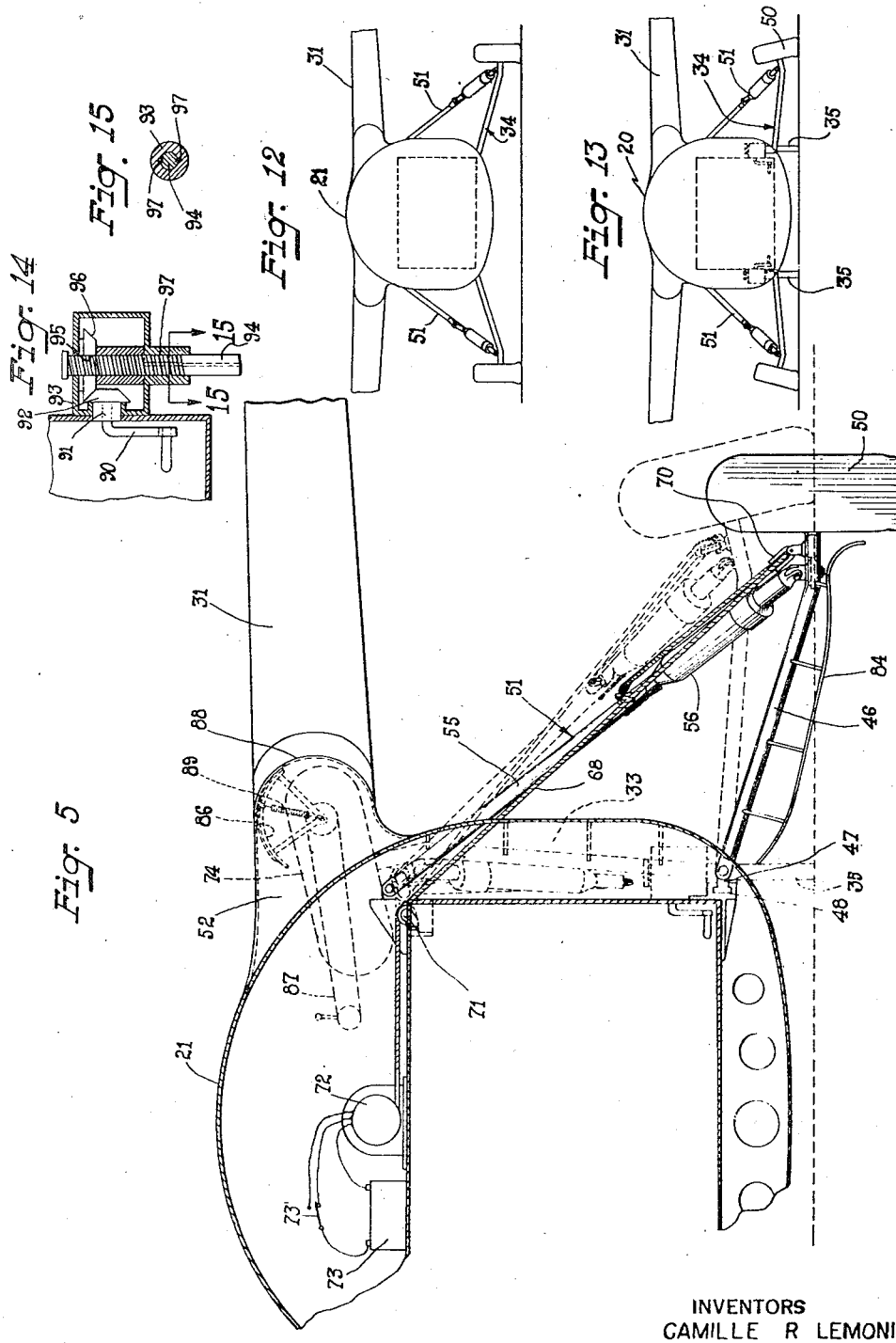

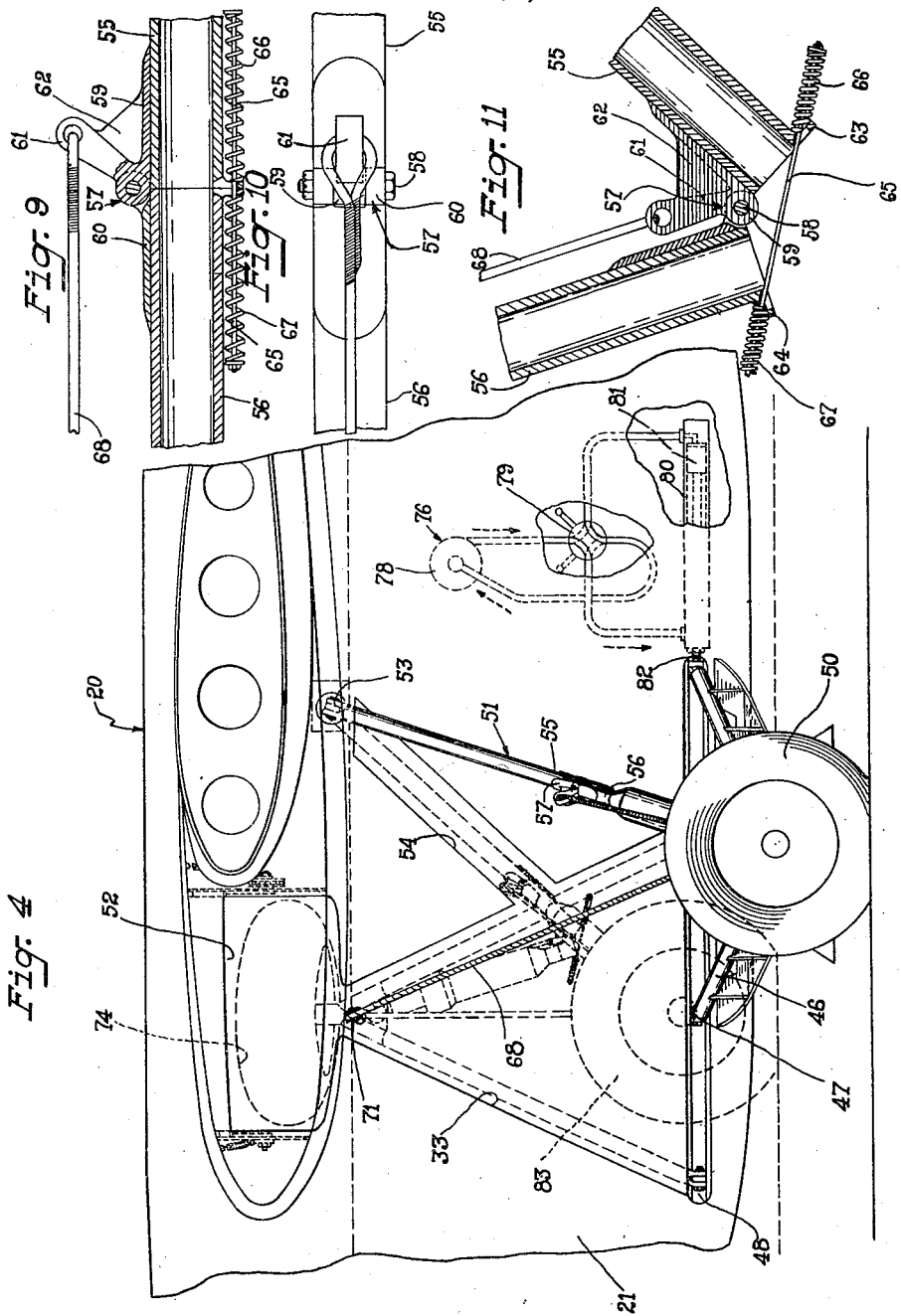

Patented Jan. 13, 1948

2,434,464

UNITED STATES PATENT OFFICE 2,434,464

CARGO AIRPLANE

Camille R. Lemonier, East Aurora, and Samuel T. Payne, Kenmore, N. Y., assignors to Curtiss-Wright Corporation, a corporation of Delaware Application June 18, 1943, Serial No. 491,402

8 Claims. (Cl. 244—137)

1

This invention relates to cargo airplanes and more particularly to the arrangement of the same such as to facilitate the loading and unloading of the cargo storage space therein.

In the cargo airplanes which are now being used for transporting cargo, the storage space is, when the airplane is in its landed position, high above the ground and difficult to load and unload with cargo. The entrance openings for the loading and unloading of the cargo are usually at the side of the airplane, making it difficult to drive motor trucks or armored equipment into the airplane since a 90° angle turn is necessary upon entering or leaving the airplane and further in order to make such loading and unloading possible, heavy ramps must be available. If these heavy ramps are not drawn into the airplane after the same is loaded, they must be provided at the destination of the airplane, thereby making necessary the landing of the airplane at a more or less fully equipped airport or be subject to the alternative of carrying a ramp of an unduly heavy construction with the airplane and consuming valuable space which could be otherwise used for the cargo.

It is, therefore, an object of the present invention to provide a cargo airplane wherein the loading and unloading facilities are improved and wherein ramps of heavy duty construction are not needed.

It is another object of the invention to provide an arrangement wherein a ramp used during the loading and unloading operations can become a useful part of the fuselage structure to receive shearing loads through the same when drawn into the airplane and thereby replacing structural parts which would otherwise be needed and hence accounting for its added weight.

It is still another object of the invention to provide a retractable landing gear arrangement which is adjustable so that the airplane body, after the airplane has landed and with the weight of the body on the landing gear, can be lowered to a position close to the ground and hence more accessible for the loading and unloading of the cargo.

According to the present invention there has been provided a cargo airplane which has a loading opening at the forward end of its fuselage transverse to the longitudinal axis thereof from above which there extends forwardly a pilot's cabin. To this pilot's cabin there is hingedly connected a pair of cowling doors adapted to fold downwardly to close off the space in front of the loading opening and under the pilot's cabin.

2

Within the transversely extending loading opening there is a ramp door adapted to be lowered to the ground to serve as means over which the airplane can be loaded and unloaded. When this door is in its closed position and latched by latch pins provided in the door and adapted to extend into the jam into which the door fits, the door serves as a shear member to take up transverse stresses of the fuselage. In the sides of the fuselage and immediately under the connection of wing portions thereto, there is provided a recess into which the landing gear is drawn. This landing gear includes a wheel-carrying arm with a wheel thereon pivoted at its near end to a guide or sliding member that is contained in a longitudinally extending guideway located on the lower portion of the fuselage. A foldable strut connects the outer end of the wheel-carrying arm with the upper portion of the fuselage. The arrangement of the wheel-carrying arm and its wheel is such that it and the strut will be automatically aligned with the recess when the slide is located at one of its positions. To complete lowering of the landing gear to its full down position, the slide with the wheel-carrying arm and its wheel is slid rearwardly from its one or intermediate down position to a full down or landing position so as to provide sufficient clearance of the bottom of the fuselage with the ground upon landing the airplane. Independent power means is used for effecting this final movement of the landing gear to its full down position and this power means is capable of returning the slide with its connected parts to the intermediate position after the airplane has landed and with its weight on the landing gear to effect lowering of the airplane body with respect to the landing gear, thereby locating the loading opening of the fuselage close to the ground so that only a minimum size ramp becomes necessary. Forward and upward movement of the landing gear wheels results and the forward end of the fuselage is lowered about an extensible jack means carried by the airplane and projected into contact with the ground to provide a fulcrum connection therewith about which the fuselage is tilted.

For other objects and for a better understanding of the invention, reference may be had to the following detailed description taken in connection with the accompanying drawings, in which Fig. 1 is a side view, in elevation, of a cargo airplane embodying the features of the present invention and showing the airplane body in its lowered or loading position with its doors opened up.

Fig. 2 is a front view of the airplane as it appears in flight with the doors closed and the landing gear retracted.

Fig. 3 is a perspective view of the airplane with the main part of the fuselage lowered or tilted about the fulcrum connection with the ground and illustrating the manner in which access is gained to the cargo compartment thereof.

Fig. 4 is an enlarged fragmentary view, in elevation, showing the landing gear in its full down position and illustrating in dotted lines the intermediate position of the landing gear and its position with its strut folded and with the landing wheel and its associated parts moved into the landing gear recess in the side of the fuselage.

Fig. 5 is a sectional view, in elevation, showing the different positions of the landing gear as viewed from a frontal direction.

Fig. 6 is a sectional view taken through the fuselage of the airplane just forwardly of its ramp and looking toward the ramp door when it is in its closed position.

Fig. 7 is a fragmentary perspective view illustrating the manner in which the ramp door fits within its jam opening.

Fig. 8 is an enlarged fragmentary view of the fluid-operated equipment for locking the ramp door to the opening.

Figs. 9, 10, and 11 are respectively sectional, side and collapsed sectional views of the foldable strut joint.

Figs. 12 and 13 are respectively diagrammatic frontal views of the airplane, the former showing the landing wheels in their full down or landing position, the latter showing the landing wheels adjusted or toed outwardly and with the cargo body in its lowered position.

Fig. 14 is a fragmentary view, in section, of the operating mechanism for the fulcrum connection.

Fig. 15 is a sectional view taken along the lines 15—15 of Fig. 14 and illustrating the keyway connection of two of the elements forming a part of the fulcrum connection.

Referring now more particularly to Figs. 1, 2, and 3, there is shown a high wing airplane 20 having a fuselage 21 adapted to carry cargo, in the forward end of which there is provided a transversely and vertically extending loading opening 22 adapted to be closed when the airplane is in flight by a ramp door 23. Above the loading opening 22 and extending forwardly thereof is a pilot's cabin 24 to the sides of which there are hingedly connected cowling doors 25 and 26 adapted to fold downwardly in front of the loading opening to contour with the fuselage and its pilot's cabin. On the rear part of the fuselage are the usual tail control surfaces 27, 28, and 29, immediately below which is located a rear landing gear or tail wheel 30. Extending laterally from the fuselage 21 are wing portions 31 which respectively carry pusher type propelling devices 32. Intermediate the end of the wings and within the side walls of the fuselage 21 there is provided a landing gear recess 33 adapted to house retractable landing gear 34. Rearwardly of the landing gear 34 and adapted to be projected from the fuselage 21 are fulcrum connections 35 adapted to make contact with the ground and about which the airplane is pivoted in a manner to be hereinafter described.

Within the loading opening 22 there is provided, as seen more readily in Figs. 6 and 7, a door jam 36 into which the ramp door 23 is tightly fitted upon being raised to its closed position. The ramp door 23 is piano hinged to the bottom of the loading opening at 37 and remains at all times a part of the airplane. Within the ramp door itself there is provided fluid-operated locking equipment 38 adapted to receive fluid pressure from any source 39 such as is usually provided on airplanes and the arrangement is such that as a valve mechanism 40 is operated, latch pins 41 and 42 located respectively close together and in the corner of the door are respectively operated by pistons 43 and 44 to enter latch opening fittings 45 in the door jam 36. To withdraw the latch pins 41 and 42, the valve 40 is thrown over to the opposite direction and as shown by dotted lines therein so that fluid acts on the opposite side of pistons 45 to which the pins are attached. Once the door is in its closed position it definitely becomes a part of the airplane fuselage to receive and transmit any shearing stresses which are set up within the airplane fuselage when the airplane is in flight.

Referring now more particularly to Figs. 4 and 5 in connection with which description will now be made to the landing gear 34 and its operation which is so constructed and designed as to make possible the lowering of the fuselage body after the airplane is on the ground and when the weight of the airplane is on the landing gear wheels. Just prior to the landing of the airplane, the landing gear is lowered to its full down position shown in full lines. In order to accomplish this, two separate phases of movement are given to the landing gear and each phase is given respectively by independent power means.

The landing gear 34 includes a wheel-carrying arm 46 which is pivoted for vertical movement at its inner end to a guide 47 adapted to slide within a guideway 48 secured to the lower portion of the fuselage 21. The outer end of the wheel-carrying arm has a wheel 50 thereon and is connected to the upper portion of the fuselage by a foldable oleo strut 51, the connection of the foldable strut with the fuselage being made at a location 53 rearwardly of a recess portion 52 of the landing gear recess 33 adapted to receive the wheel 50. This connection 53 is of the swivel type such as to permit upward pivotal movement of the strut and as well longitudinally swinging movement fore and apt of the fuselage in order that the same may be aligned with a portion 54 of the landing gear recess 33 which is adapted to house an upper part 55 of the foldable strut 51. The upper part 55 of the strut 51 is hinged to an oleo part 56 by a hinge connection 57 shown more in detail in Figs. 9, 10, and 11. The union of the strut parts is made at a location eccentric to the center axis through the same by a hinge pin 58 adapted to extend through cooperating lugs 59 and 60 on the respective parts 55 and 56. On the lug 59 is a projection operating arm 61 reinforced by a web 62. At the opposite side of the strut parts 55 and 56 from the respective lugs thereof are respectively slotted projections 63 and 64. Through the slotted projections, a rod 65 is extended on the external ends of which are respectively disposed compression springs 66 and 67 tending at all times to keep the strut parts straightened out. When it is desired to fold the two strut parts such as when the landing gear is to be disposed in the landing gear well within the fuselage, a cable 68 which connects with the projection arm 61 on the part 55 is pulled to thereby effect a pulling down of the hinge pin 58 against the action of the compression springs 66 and 67 to start the opening of the hinge joint 57. This cable 68 extends downwardly for connection with a pulley 70 swiveled on the outer end of the wheel-carrying arm 46 and thence upwardly over a pulley 71 in the top of the fuselage for connection with an electrically driven winch 72 driven by a battery 73 upon closing a reversing switch 73'. As this winch is turned to wind up the rope, the strut is collapsed and simultaneously the wheel-carrying arm 46 is carried upwardly about its pivot connection with the guide element 47 in its forwardly extended position in the slideway 48, the wheel-carrying arm 46 and the wheel 50 will be aligned with the portion 52 of the landing gear well 33 so that the landing gear will assume the dotted line position shown at 74 in Figs. 4 and 5. The oleo strut will have been folded and the parts will assume the position in Fig. 11 and the strut part 55 will be folded into its portion 54 of the landing gear well 33.

To slide the landing gear wheel 50 and its wheel-carrying arm 46 along the guideway 48, there is provided a fluid-operated power arrangement 76 having a fluid pressure source 78, a valve 79, and a double acting fluid actuator 80, having a piston 81 therein. As fluid is delivered to the rear of the piston, the slide 47 which is connected with the piston as shown at 82 will be moved forwardly along the guideway 48 and when the piston 81 is fully extended, the wheel-carrying arm 46 will be properly located for alignment with the main part of the landing gear well 33. With the landing gear wheel located in this position and the piston 81 having been projected forwardly when the airplane is on the ground, the fuselage 21 is lowered to assume a position shown in Figs. 1 and 13, the landing gear having been moved to an intermediate or dotted line position 83. While the wheel-carrying arm 46 is being projected forwardly by the power arrangement 76, the same is forced to be pivoted upwardly by the strut 51. The swivel connection 53 of the strut 51 with the fuselage permits this adjustment so that in effect as the landing gear is moved to the intermediate position 83, a toeing out of the wheels 50 themselves will be had as seen best in Fig. 13. In order to close the landing gear well 33, there is provided on the wheel-carrying arm 46, a closure member 84 which fairs into the side of the fuselage as the landing gear is drawn into the landing gear well 33. A closure plate 85, Fig. 3, closes the strut part recess portion 54 of the landing gear well 33.

To close the wheel 50 within the landing gear well 33, there is provided a rotatable closure plate 86 adapted to be rotated by chain and sprocket mechanism 87 to swing the plate down and into an opening 88. The plate 86 is forced into the opening 88 by a spring 89.

Prior to the adjusting of the landing gear to the intermediate position 83, the fulcrum connection 35 with the ground is made. The means for providing this fulcrum connection is located rearwardly of the landing gear and is constructed in a manner shown more clearly in Figs. 14 and 15. It is carried by the fuselage and is operable by a removable hand crank 90 adapted to fit into a socket 91 within a bevel gear 92 journalled on a housing 93. Extending downwardly from the housing 93 for contact with the ground is a strut 94 threaded at its upper end to work within a threaded opening 95 of a gear 96 adapted to be driven by the gear 92. Since the gear 96 is prevented from being vertically displaced by the housing 93 and since the strut 94 has keyways 97 to prevent its rotation with respect to the housing 93, the strut 94 will be moved in or out depending upon the direction of the rotation of the crank handle 90. Once the airplane has been landed with the landing gear in its full down position, the struts 94 are fully projected to contact the ground. The fluid-operated arrangement 76 will then be operated to return the landing gear to its intermediate position 83 to thereby effect lowering or tilting of the fuselage body about the fulcrum connections 35.

It should now be apparent that there has been provided an arrangement whereby the entire fuselage can be lowered to the ground making it unnecessary to have heavy ramps for the loading of equipment into the cargo airplane. It should also be apparent that by this arrangement that the ramp is of minimum size and becomes when withdrawn into the fuselage a useful part of the same serving as a stress-carrying member and all this being done without consuming space or adding to the weight of the airplane.

While various changes may be made in the detailed construction, it shall be understood that such changes shall be within the spirit and scope of the present invention as defined by the appended claims.

We claim as our invention:

1. In combination, an airplane having a fuselage with upper and lower portions, retractable landing gear for the airplane including a guide track extending longitudinally along the lower portion of the fuselage, a guide carried by the guide track for sliding movement therealong, a wheel-carrying arm with a wheel thereon, said wheel-carrying arm being pivoted on the guide for vertical retracting movement, a strut for holding the wheel arm in its down position pivoted to the upper portion of the fuselage for fore and aft swinging movement and serving to cause vertical movement of the landing gear wheel as the guide is moved, and means for moving the guide along the track to effect thereby partial retraction of the landing gear.

2. In combination, an airplane having a fuselage with a landing gear recess in its side thereof, a guide track extending longitudinally on the fuselage along its lower edge thereof, a guide slidable along the guide track, a wheel-carrying arm with a wheel thereon, said wheel-carrying arm pivoted on the guide for vertical retracting movement into the landing gear recess, a foldable strut for holding the wheel arm in its down position and pivoted to the fuselage for fore and aft movement, said strut being adapted to be folded into the fuselage recess at one position of the guide on its guide track but being automatically movable out of the recess upon the landing gear being moved downwardly, and means for moving the guide along the track to effect final movement of the landing gear to its full down position.

3. The combination with an airplane and the fuselage thereof, of a retractable landing gear including an arm, means for pivotally connecting the inner end of said arm to said fuselage, a wheel carried by the outer end of said arm, a folding strut which is pivotally connected to said fuselage which cooperates with said arm to hold said wheel in an extended position, means for moving said pivotal connecting means to effect partial retraction of said landing gear while said strut is held in extended position, and means for folding said strut to complete retraction of said landing gear.

4. The combination with an airplane and the fuselage thereof, of a retractable landing gear including an arm, a slide for connecting the inner end of said arm to said fuselage, a wheel carried by the out end of said arm, a collapsible strut which when extended cooperates with said arm to hold said wheel in an extended position, and means which is operable while said strut is extended for moving said slide to thereby lower said airplane by effecting a partial retraction of said landing gear.

5. The combination with an airplane and the fuselage thereof, of a retractable landing gear including an arm, a slide for pivotally connecting the inner end of said arm to said fuselage, a wheel carried by the outer end of said arm, a folding strut which is pivotally connected to said fuselage and which cooperates with said arm to hold said wheel in an extended position, means for moving said slide to effect partial retraction of said landing gear while said strut is held in extended position, and means for folding said strut to complete retraction of said landing gear, said slide moving means and strut folding means being independently operated.

6. The combination with an airplane and the fuselage thereof, of a retractable landing gear including an arm, a slide for pivotally connecting the inner end of said arm to said fuselage, a wheel carried by the outer end of said arm, a collapsible strut which is pivotally connected to said fuselage and which cooperates with said arm to hold said wheel in an extended position, and means which is operable while said strut is extended to move said slide, whereby to swing said arm and strut about their pivotal connections and thus lower said airplane by effecting a partial retraction of said landing gear.

7. The combination with an airplane and the fuselage thereof, of a retractable landing gear including an arm, a slide to which the inner end of said arm is pivotally connected, a guideway for said slide extending longitudinally of said fuselage and adjacent the lower edge thereof, a wheel carried by the outer end of said arm, a collapsible strut which is pivotally connected at its inner end to said fuselage, which is pivotally connected at its outer end to said arm and which cooperates with said arm to hold said wheel in an extended position, and means which is operable while said strut is extended to move said slide along said guideway, whereby to swing said arm and strut about their pivotal connections and thus lower the airplane by effecting a partial retraction of said landing gear.

8. In combination with an aircraft having a vertically adjustable landing gear spaced longitudinally in one direction from the center of gravity of the aircraft, a landing gear element spaced longitudinally from the center of gravity in the opposite direction, said landing gear and landing element being adapted to support the aircraft upon landing, and support means disposed between said landing gear and landing element and spaced longitudinally from said center of gravity in said opposite direction, said support means being adjustable vertically on the aircraft to be in a raised position above a position of contact with the ground during landing of the aircraft on said landing gear and landing gear element, and to be lowered relative to the aircraft into contact with the ground subsequent to landing, the support means when so lowered being adapted to serve as a fulcrum about which the aircraft may be tilted upon vertical adjustment of said langing gear.

CAMILLE R. LEMONIER.
SAMUEL T. PAYNE.

REFERENCES CITED

The following references are of record in the file of this patent:

UNITED STATES PATENTS

| Number | Name | Date |
|---|---|---|
| 2,106,289 | Wallace | Jan. 25, 1938 |
| 2,268,009 | Babb et al. | Dec. 30, 1941 |
| 2,323,279 | Van Zelm | June 29, 1943 |
| 2,049,066 | Kindelberger et al. | July 28, 1936 |
| 1,810,244 | Hicks | June 16, 1941 |
| 1,482,520 | Lyon | Feb. 5, 1924 |
| 1,496,200 | Baumann et al. | June 3, 1924 |
| 1,716,439 | Gray | June 11, 1929 |

FOREIGN PATENTS

| Number | Country | Date |
|---|---|---|
| 814,014 | France | Mar. 8, 1937 |